United States Patent [19]

Mally et al.

[11] Patent Number: 5,118,519
[45] Date of Patent: Jun. 2, 1992

[54] CASINGLESS SAUSAGE LINE

[75] Inventors: Timothy G. Mally, Oregon; Gary A. Handel, Madison; Nilang Patel, Madison; Dean F. Schwarz, Madison, all of Wis.

[73] Assignee: Oscar Mayer Foods Corporation, Madison, Wis.

[21] Appl. No.: 745,631

[22] Filed: Aug. 15, 1991

Related U.S. Application Data

[63] Continuation-in-part of Ser. No. 587,839, Sep. 25, 1990, Pat. No. 5,056,425, and a continuation-in-part of Ser. No. 575,044, Aug. 30, 1990, which is a continuation of Ser. No. 400,080, Aug. 29, 1989, Pat. No. 4,989,505.

[51] Int. Cl.$^5$ .................. A22C 7/00; A22C 11/00
[52] U.S. Cl. .................. 426/513; 99/353; 99/472; 99/483; 99/494; 426/92; 426/277; 426/516
[58] Field of Search .............. 426/513, 512, 516, 517, 426/277, 92, 231, 412; 99/353–355, 443 C, 472, 483, 356, 359, 360, 494, 516, 484, 485; 425/297, 311, 325, 327, 332, 373; 264/148, 310; 452/30, 50

[56] References Cited

U.S. PATENT DOCUMENTS

| | | |
|---|---|---|
| 2,953,461 | 9/1960 | Prohaska . |
| 3,005,716 | 10/1961 | Moreland . |
| 3,063,842 | 11/1962 | Podebradsky . |
| 3,456,285 | 7/1969 | Miller . |
| 3,537,385 | 11/1970 | Puschner et al. .......... 99/353 |
| 3,781,447 | 12/1973 | Durso ................ 426/513 |
| 3,834,849 | 9/1974 | Supran et al. ........... 425/206 |
| 3,889,013 | 6/1975 | Moule ............... 99/353 X |
| 3,902,388 | 9/1975 | New . |
| 3,916,483 | 11/1975 | Vinokur . |
| 4,113,890 | 9/1978 | Long ............... 99/355 X |
| 4,124,339 | 11/1978 | Bernard ............ 425/133.1 |
| 4,192,639 | 3/1980 | Jones, Jr. ............ 425/372 |
| 4,207,281 | 6/1980 | Bernard . |
| 4,258,066 | 3/1981 | Bernard .............. 426/321 |
| 4,280,803 | 7/1981 | Treharne ............. 425/99 |
| 4,294,858 | 10/1981 | Moule ............... 426/513 |
| 4,379,356 | 4/1983 | Geissbuhler . |
| 4,404,229 | 9/1983 | Treharne ............. 426/513 |
| 4,414,707 | 11/1983 | Koken . |
| 4,610,844 | 9/1986 | Matthews et al. ........ 426/641 |
| 4,642,847 | 2/1987 | Ross . |
| 4,726,093 | 2/1988 | Rogers . |
| 4,989,505 | 2/1991 | Mally . |

Primary Examiner—Timothy F. Simone
Attorney, Agent, or Firm—Lockwood, Alex, Fitzgibbon & Cummings

[57] ABSTRACT

An apparatus and method are provided for processing batter materials, such as food batter, including sausage batter for wieners and the like, without incorporating the use of any casing for the batter. An elongated ribbon or flow of proteinaceous batter material is extruded or otherwise formed and treated to have a proteinaceous skin made by congealing surface batter materials with a treating arrangement. This flow is then severed into a plurality of blanks, followed by forming unfinished ends of the blanks into shaped links. The shaped links are then cooked and typically packaged as desired to provide a finished sausage product.

44 Claims, 5 Drawing Sheets

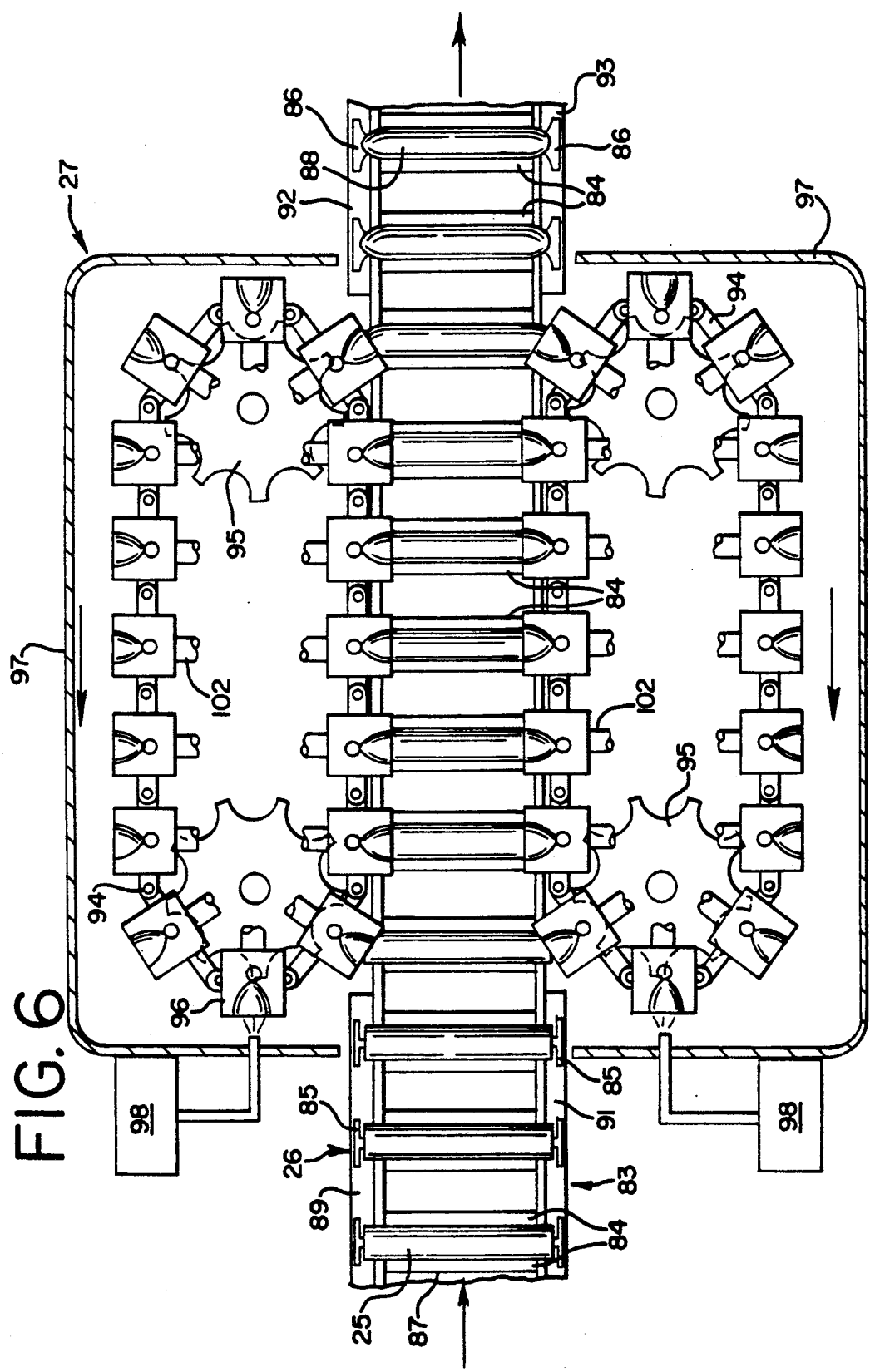

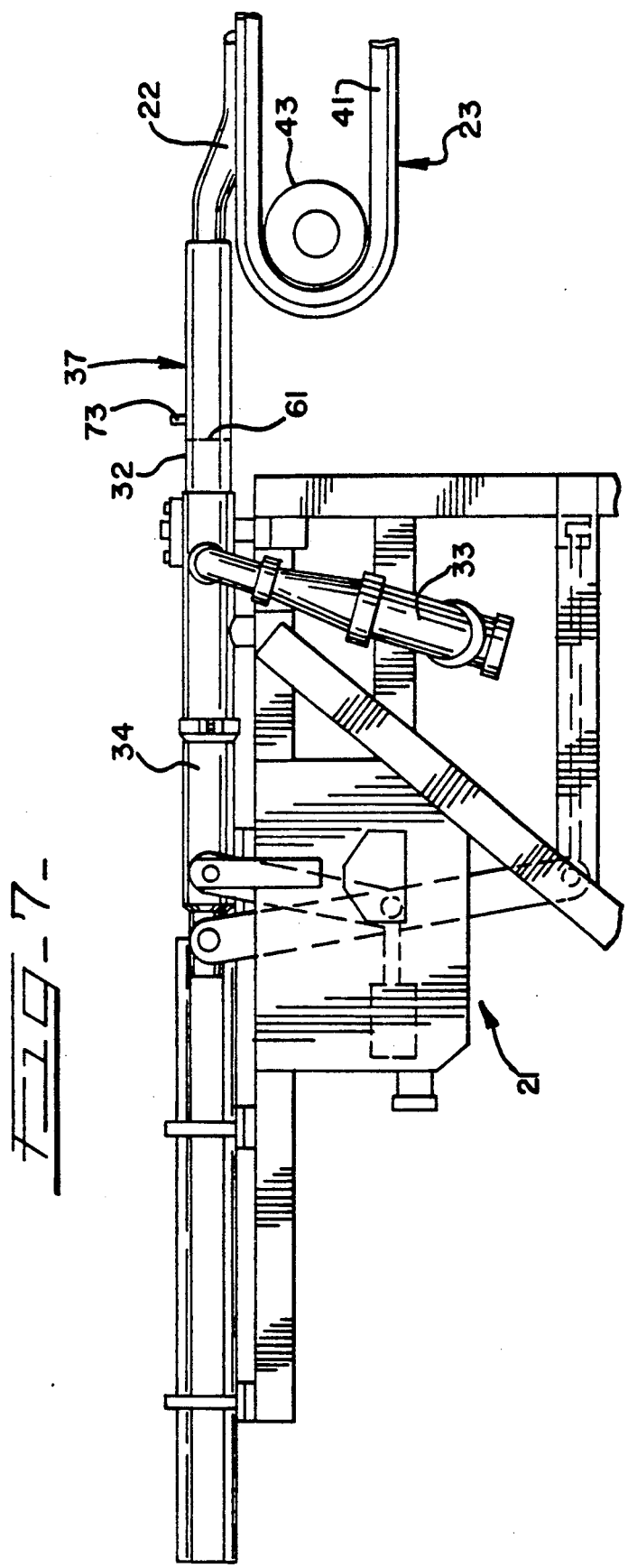

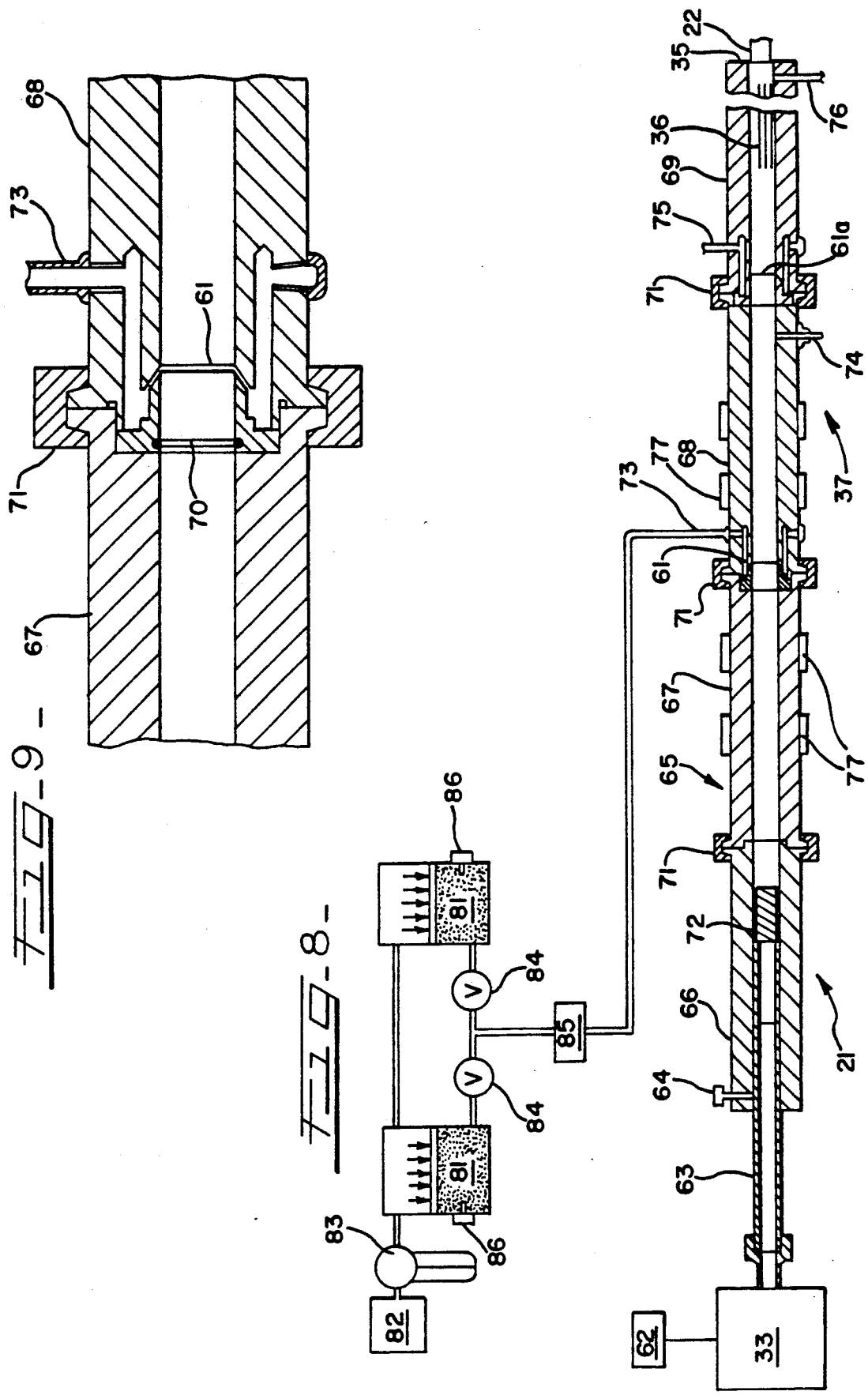

CASINGLESS SAUSAGE LINE

This is a continuation-in-part of application Ser. No. 587,839, filed Sept. 25, 1990, now U.S. Pat. No. 5,056,425 and of application Ser. No. 575,044, filed Aug. 30, 1990, which is a continuation of application Ser. No. 400,080, filed Aug. 29, 1989, now U.S. Pat. No. 4,989,505.

BACKGROUND AND DESCRIPTION OF THE INVENTION

The present invention generally relates to an apparatus and a method for forming proteinaceous batter into shaped products without using a casing or the like. More particularly, the invention relates to an apparatus and method for forming casingless shaped products, such as casingless sausage and the like. An elongated ribbon or flow of proteinaceous batter material having a proteinaceous skin thereon is formed, supported and severed into a plurality of blanks having unfinished ends. After the unfinished ends are shaped as desired, the resulting shaped blanks or links are raised to a temperature at which the proteinaceous batter thereof is congealed. Further heating substantially fully cooks the shaped blanks to provide cooked link products.

Various devices are known for shaping batter materials such as sausage batter, other food product batters and the like, and stuffing the batter into a casing, which casing can complete the shaping of the batter as desirable while maintaining the desired shape during further processing. Often, the further processing includes cooking or other procedure which modifies the consistency of the batter such that it will substantially maintain its desired shaped. At least in the case of wieners and other sausage products, each casing is subsequently removed during processing so that the product purchased by the consumer is a so-called casingless product, even though a casing had been used during processing. Such casing removal requires a specially designed apparatus, such as the one illustrate in Koher U.S. Pat. No. 4,414,707.

Various devices have been proposed for forming and processing sausages and the like without using casings. One suggested approach has been to form and cook a food batter within an elongated tube which has end-shaping plugs periodically spaced therewithin, as illustrated in U.S. Pat. No. 4,113,890. This requires a continuous inserting of the batter and plugs into the tube and a removal of the plugs and cooked batter out of the tube. Another patent, Rogers U.S. Pat. No. 4,726,093, proposes making food products such as skinless sausages through the use of a series of plugs that engage a tube within which the batter is cooked.

Another suggested approach is to use a plurality of hollow molding tubes that are conveyed sequentially through an endless path. Geissbuhler U.S. Pat. No. 4,379,356 proposes the use of a plurality of molds having an open end such that sausage material will expand out of the tube and, this patent suggests, be formed into rounded sausage ends when each molding tube is conveyed through a heating zone, which is shown as a hot water bath.

In another proposal, sausages are shaped within fully enclosed molds, each having a permeable wall through which an edible acid is introduced. Treharne U.S. Pats. No. 4,280,803 and No. 4,404,229, incorporated by reference hereinto, show such a system wherein the edible acid is said to react with protein in a meat or meat-like material within the molds to form a cohesive surface.

Suggestions in the art as are exemplified by these patents call for shaping of a batter-originating product within a tube or mold and thereafter removing the finally shaped product from the mold, and typically from a plurality of mold cavities or a mold cavity having a plurality of molding locations. Proposals of this general category tend to require complicated apparatus features, often including a complex molding structure having various moving parts and/or multiple components, which at times must be accurately indexed and/or aligned with respect to each other.

By proceeding in accordance with the present invention, batter such as sausage batter and the like is transformed into a shaped product such as a sausage or the like without having to form that product within a casing and subsequently remove and discard the casing. An apparatus is provided wherein the batter is stuffed into a shaped cavity having treating means to initiate formation of a proteinaceous skin, which skin holds the batter together and imparts to it a preliminary shape which approximates the desired final shape of the product. This preliminarily shaped product is removed from the molding assembly as an elongated flow of treated proteinaceous batter material. Additional set-up time for proteinaceous skin formation is typically imparted by receiving the elongated flow or ribbon of treated proteinaceous batter material onto a moving support member. The elongated flow is severed into blanks, which are selected lengths of the preliminarily shaped products. In an illustrated embodiment, these blanks are subjected to further shaping to impart a generally rounded or dome-like configuration to each end of each blank by the operation of an end forming assembly, which is preferably one that subjects the ends to vacuum molding conditions. Thereafter, each blank is cooked and packaged, preferably while utilizing a multi-staged cooking arrangement that includes raising the shaped blanks to a temperature at which congealing takes place, followed by substantially fully cooking the previously heated and congealed blanks to a desired cooking temperature.

It is a general object of the present invention to provide an improved apparatus and method for transforming batter into shaped products without utilizing casings or the like.

Another object of the present invention is to provide an improved apparatus and method that includes forming at least a portion of a batter-originating product with an assembly which does not include a product-conforming mold cavity.

Another object of this invention is to provide an improved apparatus and method for making casingless food products that can be cooked and then packaged.

Another object of the present invention is to provide an improved apparatus and method for forming casingless products that can be packaged and then aseptically cooked within the package.

Another object of this invention is to provide an improved sausage-making apparatus which is of an especially simplified construction.

Another object of the present invention is to provide a sausage-making apparatus which reduces the cost of utilities when compared with conventional casing-utilizing systems.

Another object of the present invention is to provide an apparatus and method for making sausages and the like that does not require any casing removal devices.

Another object of this invention is to provide an improved apparatus and method for making casingless sausages which emulate the appearance of sausages made within casings.

Another object of the present invention is to provide an improved apparatus and method incorporating cooking arrangements that conserve energy and provide a casingless product having a texture, consistency and appearance which are substantially the same as those of sausages formed and cooked within casings.

Another object of this invention is to provide a dwell conveyor for receiving and transporting an elongated sausage batter extrusion after treatment of same and prior to severance of same into generally link-sized blanks.

Another object of the present invention is to provide an improved apparatus and method incorporating vacuum molding techniques for imparting dome-shaped ends that have the appearance of sausage ends formed within casings.

Another object of the present invention is to provide an improved apparatus and process wherein packaging arrangements contribute to the formation of casingless sausage links.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 6 is top plan view of a preferred end-forming station;

FIG. 7 is an elevational view of the formation of the elongated flow of sausage batter;

FIG. 8 is a cross-sectional view of an illustrative embodiment of the treating means component shown in FIG. 7; and FIG. 9 is an enlarged detail view of a portion of the treating means illustrated in FIG. 8.

DESCRIPTION OF THE PARTICULAR EMBODIMENTS

Figure 1:
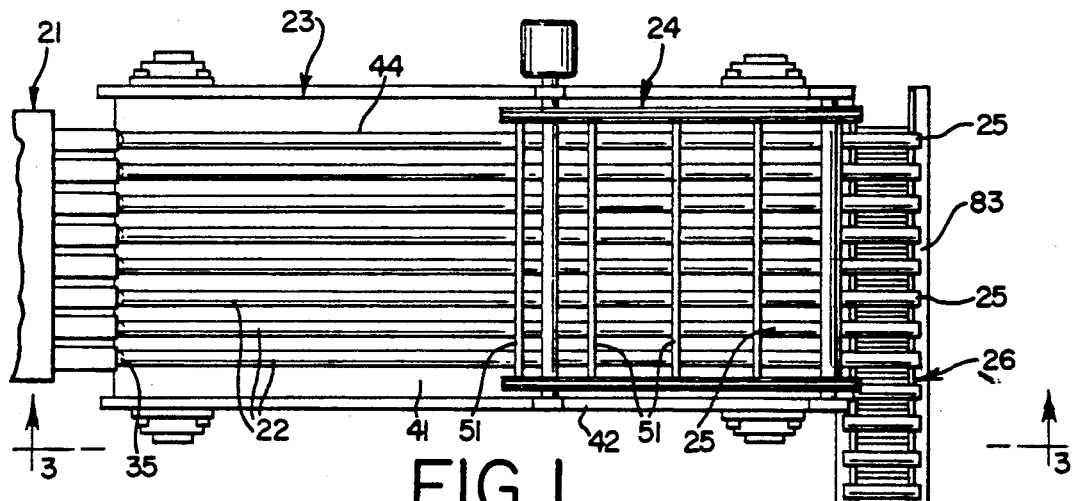
FIG. 1 is a top plan view of a sausage processing line incorporating features according to the present invention.

The casingless sausage line generally illustrated in FIG. 1 includes a stuffing assembly, generally designated as 21, for providing an elongated ribbon or flow 22 of proteinaceous batter material. In this illustrated embodiment, a plurality of such elongated flows, namely eight of them, are provided by the stuffing assembly 21. Virtually any number of elongated batter flows 22 can be provided, for example between 1 and 12 of them. A conveyor assembly, generally designated as 23, is shown receiving the elongated proteinaceous batter flows from the stuffing assembly 21. In the illustrated arrangement, the stuffing assembly 21 and conveyor assembly 23 are in a co-linear relationship with each other. At a suitable location, a severing assembly, generally designated as 24, forms each elongated ribbon or flow of proteinaceous batter material 22 into a plurality of blanks 25 which generally correspond to the length of sausage product being prepared on the casingless sausage line. The blanks 25 are collected by a transfer assembly, generally designated as 26, for further processing as desired depending upon the sausage product being prepared.

The embodiments illustrated herein are particularly well-suited for preparing wieners or hot dogs, typically without requiring any modification to batter formulations for making the hot dogs within casings. The batter can be based on red meat, poultry, fish and the like, often in the form of a thin, relatively non-viscous batter, although fat, moisture content and viscosity can be varied depending upon the type of sausage to be made. So-called fresh products or products having a grind that is coarser than a typical hot dog batter, such as a bratwurst type of product, can be used. Lunchmeat types of products such as bologna and the like could be formed from emulsion batters.

For sausage products that traditionally have a dome-shaped or rounded end configuration to impart a general "bullet" shape to the sausage ends, an end forming assembly, generally designated as 27 and described in greater detail hereinafter, can be provided to impart this type of shape to the blanks 25. For other types of products, there is no need to impart a dome-shaped configuration. In these instances, the generally flat ends of the blanks can be sealed and/or shaped as desired. An end forming assembly having a cavity configuration different from that as shown can be used. Alternatively, an electronic assembly (not shown) could be used, especially when it is desired to also at least partially cook the blank while sealing and/or forming the ends. In this instance, a negative plate is positioned for engagement of one end of the blank, while a positive plate is positioned for engagement of the other end of the blank. Appropriate currents and voltages are applied in order to achieve the result desired in preparing the particular sausage item.

When preparing cooked sausage products, it is typically preferred to provide a two-stage cooking arrangement including a heating assembly 28 and a secondary heating assembly 29. In this arrangement, described in greater detail hereinafter, the heating assembly 28 heats the blanks to a temperature at which the proteinaceous material is congealed, and the secondary heating assembly 29 completes the cooking thereof, preferably by a procedure including microwave energy. When the product is to be packaged, a packaging assembly 31 will be provided. For some types of products such as vacuum packaged wieners, it has been found that the packaging cooperates with the previous procedures accomplished by the invention in order to impart a desired final appearance and shape to the sausages.

With more particular reference to the structures shown in the drawings, the stuffing assembly 21 can be configured generally in accordance with FIGS. 7, 8 and 9 in the preferred embodiment wherein treating to form the proteinaceous skin or hide of the elongated batter flow(s) 22 is achieved primarily by contacting the initially formed batter with a treating fluid. Other treating approaches can be carried out such as those utilizing heat in order to form the skin or hide. Even in the illustrated embodiment wherein a treating fluid is used, the horn portion of the device preferably is heated at levels less than that which would (absent the treating fluid) form the skin or hide, but that is adequate to melt the fat materials so as to provide lubricating properties during passage through the stuffing apparatus. It is further believed that this type of heating accelerates the skin or hide formation by the treating fluid. Preferably, the treating fluid is itself heated in order to take advantage of this effect. A stuffing assembly incorporating heating for forming the proteinaceous skin or hide is described in U.S. Pat. No. 4,989,505 which is incorporated by reference hereinto.

Regarding the stuffing assembly 21 having a shaping or horn assembly, this includes a molding compartment such as the illustrated tube 32. Batter from the batter preparation apparatus 21 is pumped into the molding compartment 32 through suitable equipment such as that including the illustrated stuffing supply assembly 33. A suitable ejection mechanism, for example the piston or ram mechanism 34 illustrated in FIG. 7, will eject the flow(s) of proteinaceous batter 22 out of an open end 35 of the molding component 32. A plurality of elongated wires 36 are preferably included within the molding compartment 32 in order to generally longitudinally orient hide fibers or other components of the pumped batter.

A treating assembly, generally designated as 37, is associated with the molding compartment 32. When the molding compartment is generally tubular in shape, it is preferred that the tubular inside surface of the treating assembly 37 have a generally circumferential fluid introducer therealong, such as the illustrated circular orifice 61 in order to thereby treat the pumped batter passing through the tubular inside surface of the molding compartment 32 with a suitable treating fluid. Batter passing through the tube on a continuous flow basis is thereby surface treated or congealed in order to initiate formation of the proteinaceous skin or hide 38 (FIG. 2) of batter material. A typical skin 38 which thickness on the conveyor assembly 23 is on the order of about 0.020 to about 0.050 inch thick. Each flow 22 also includes a core portion 39, which is essentially raw batter.

Specifically referring to the stuffing assembly 21 that is illustrated in the drawings, especially FIGS. 8 and 9, a pressure transducer 62 imparts the proper pressure conditions to the stuffer supply assembly 33 for passing the batter through the stuffing assembly 21. Stuffing assembly 21 includes a horn 63 secured by an attachment means, such as the illustrated thumb screw 64, to a tube, generally designated as 65. If desired tube 65 can be an assembly of tubular members 66, 67, 68, 69 joined by appropriate means such as clamps 71 securing together flared ends of the tubular members. Horn 63 has a tip 72, for directing the batter into the tube 65.

Treating assembly 37 includes at least one orifice 61 opening into the tube 65. The illustrated orifice 61 is circular and, as previously stated, is the passageway through which the treating fluid flows into the tube 65. A conduit assembly 73 supplies pressurized treated fluid to the orifice 61. An O-ring 70 can be included, preferably upstream of the orifice 61, which has been found to provide a smoother skin surface than when the ring 70 is downstream of the orifices(s). If desired, a recirculation conduit assembly 74 also can be included in order to recycle the treating fluid. Tube 65 can also include another orifice 61a and a conduit assembly 75 downstream of the treating fluid orifice 61, and another recirculation conduit assembly 76 can be incorporated as well.

Details of a suitable arrangement for supplying treating fluid to the conduit assembly 73 are given in FIG. 8. Treating fluid, typically including a food grade acid, is stored within reservoirs 81 of the type within which air pressure is imparted thereto from an air supply 82 and a regulator 83. When desired, the fluid can be heated by suitable heaters 86, typically between about 160° and 200° F. for a wiener batter, either within the reservoirs 81 or at any other suitable location. Valves 84 and a pressure transducer 85 regulate the flow of fluid out of the reservoirs 81 and to the orifice 61 and/or 61a. A continuous flow of batter proceeds through the stuffing assembly 21 and the treating assembly 37, and each stuffing assembly 21 and treating assembly 37 unit is able to provide superior throughput as the batter continuously flows therethrough.

When all of the treating fluid orifice 61, the other orifice 61a, and the conduit assemblies 73, 74, 75 and 76 are incorporated into the treating assembly 37, the operation proceeds in the following manner. Pressurized and preferably warm treating fluid, typically including a food grade such as vinegar, enters through orifice 61 and contacts the outside surface of the flowing batter. A preferred treating fluid is an acid composition of acetic acid, liquid smoke and water. It has been found that materials such as liquid smoke also impart lubricating properties which facilitate processing. Any excess treating fluid can be recycled through conduit 74, typically near the downstream end of tubular member 68. Additional treating fluid or other desired fluid cycles through tubular member 69 from conduit assembly 75 to downstream conduit assembly 76. Typically, adequate fluid flow is achieved under usual conditions when the orifice 61 (and orifice 61a when included) provide a very narrow gap, on the order of 0.015 inch or less. The batter itself can be heated by suitable heating means 77.

If the heating is provided to an excessive degree, a buildup of what is believed to be protein can develop on the internal surfaces of the tubular members, apparently due to denaturing of protein in the batter. If the temperature is too low, a fat buildup can be experienced. These buildups, particularly fat buildup, tend to form grooves into the flow of proteinaceous batter. Typically, the fat buildup takes the form of teardrop-shaped particles which are generally closely downstream of the annular ring 61. Accordingly, it is preferable to include assemblies of generally known types to monitor the temperature within the stuffing assembly 21 and at times vary the degree of heating imparted to any of the heating units associated with the stuffing assembly 21 in order to minimize these types of protein and fat buildup problems. With respect to the temperature, it also is important that same be maintained below boiling temperature in order to avoid water boilout from the batter.

Preferred conveyor assembly 23 is shown in FIGS. 1, 3, 4 and 5. Included is an endless belt 41 mounted onto a suitable conveyor apparatus 42 including relatively large diameter pulleys in order to permit the belt 41 to be conveyed in an endless manner without damaging the belt 41. The profile of the belt 41 is of a relatively substantial depth in order to accommodate channels 44 therewithin. In operation, the flow(s) of proteinaceous batter material 22 are received within the channel(s) 44.

Each channel 44 is substantially in line with each tubular member terminating in open end 35 of the stuffing assembly 21. Belt 41 is conveyed at a linear speed that is similar to the linear speed at which the flow(s) 22 are extruded out of the open end(s) 35.

Figure 5:
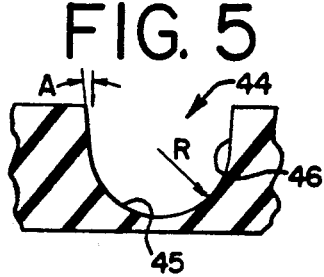
FIG. 5 is an enlarged, cross-sectional view illustrating details of the conveyor shown in FIG. 4.

The channels 44 are generally U-shaped to provide a rounded type of elongated cradle for receiving the extruded flow(s) 22. FIG. 5 provides a detailed view of the type of general U-shaped section that can be provided for each of the channels 44. With particular reference to FIG. 5, the channels 44 illustrated therein have a cross-section including a generally semi-circular component 45 extending to chamfered sides 46. Each chamfered side 46 provides a general mouth opening that is wider than tangents to the semi-circular component 45, taken in a vertical direction as illustrated in FIG. 5. There is thus provided a chamfer angle "A" as illustrated in FIG. 5. That chamfer angle should be on the order of about 5 degrees to 10 degrees, and the chamfered sides lessen the likelihood of damage to the flow(s) 22 during entry into the channel(s) 44.

Conveyor assembly 23 supports the flow(s) of proteinaceous batter material 22 and provides time for the treatment thereof to progress so as to improve the handling properties of the elongated ribbon(s) or flow(s) 22. A typical dwell time in this regard is between about 30 and about 90 seconds, depending upon the proteinaceous material batter and the treatment to which it had been subjected. In other words, the conveyor assembly 23 provides a dwell time or a set-up time to permit the desired treatment to take place prior to a subsequent step of the procedure. Preferably, a controlled environment will accompany the conveyor assembly 23 in order to provide consistency in conditions, including time, temperature and humidity to which the ribbon(s) or flow(s) are subjected after leaving the open end(s) 35.

The ribbon(s) of proteinaceous batter-leaving the open end(s) 35, generally irrespective of how long the treatment composition was in initial contact with the batter, will have an extremely thin skin or hide, for example on the order of about one thousandth of an inch. After the skin has set up along the conveyor assembly 23, the thickness of the skin or hide 38 will be up to about twenty thousandths of an inch or greater, which tends to prevent further treating composition that may remain on the surface from penetrating into the proteinaceous batter. It is believed to be particularly important that the support pathway provided by the endless belt 41 be as straight and as free of any type of directional changes as reasonably possible. Bending or other maneuvers that avoid a substantially totally level and straight pathway can lead to misshapen final products. Preferably, automatic sanitizing of the endless belt 41 is provided by suitable washing and/or rinsing baths or equipment (not shown) which treat the endless belt 41 while it is along the bottom portion of its run.

Once a suitable skin has been developed, each flow or ribbon 22 is formed into individual blanks 25 having a length approximating that desired for the finally prepared sausage product. The severing assembly 24 that is illustrated to achieve this purpose includes an arrangement which cooperates with the moving endless belt 41 such that a severing surface enters into each of the channels 44 while simultaneously providing a function for transferring severed blanks off of the endless belt 41 and onto the transfer assembly 26.

More particularly, the illustrated severing assembly 24 includes a series of severance blades 51 mounted for engagement with the elongated ribbon or flow 22 within each channel 44, followed by a continuation of that engagement and a release of that engagement upon depositing each blank to its desired transfer location. Each blade assembly 51 includes a cutting member 52 for each channel 44 of the conveyor assembly 23. Furthermore, each cutting member 52 has a blade configuration that is complementary with the cross-sectional profile presented by the channels 44. Each severance blade assembly 51 is mounted for movement with suitable means such as the illustrated chain and sprocket drive arrangement 53. Severing assembly 24 thus provides a guillotine-type of action whereby each cutting member 52 moves generally downwardly into and through each ribbon or flow 22 until complete severance thereof is accomplished, after which the cutting member 52 rises to an out-of-engagement orientation.

While the urging of each blank 25 by the serial movement of the cutting members 52 through each channel 44 accomplishes a transfer of the blanks, movement of the just-formed blanks 25 from the conveyor assembly 23 and onto the transfer assembly 26 can be assisted by structures such as transfer conveyors, star-wheel types of transfer devices, vacuum pickup mechanisms, and the like. A requirement is that each blank 25 be reasonably well-supported during transfer because of the bendable and somewhat fragile nature of the blanks 25.

When it is desired to modify the shape of the ends of the blanks 25, the end forming assembly 27 is utilized, and it might be desirable to combine the blank transfer with a function for orienting the blanks to carry out this end treatment. A function to be accomplished in this regard is to support the central length of each blank while exposing the end portions of the blank. FIGS. 1 and 6 illustrate a mechanical arrangement in this regard which includes a roller conveyor 83 wherein each blank is supported by rollers 84, which preferably include end projections 85 to minimize lateral movement of the blanks 25. Similar end projections 86 are preferably provided downstream to control movement of formed links 88 of the end forming assembly 27.

In the arrangement illustrated in FIGS. 1 and 6, the transfer assembly 26 takes the form of a roller conveyor which supports the blanks. Included is a central run 87 in which rollers 84 are provided in blank-supporting and blank-rotating pairs which are evenly spaced from each other and which convey the blanks 25 and subsequently formed links 88 to and through the end forming assembly 27. Some or all of the roller pairs can be associated with a driven intermediate roller to facilitate rolling of the blanks if needed. Flanking at least the downstream end of the roller conveyor are edge platforms 89, 91, which may be conveyed pathways, that support the ends of the blanks 25 during transfer and that terminate immediately prior to the location at which the end forming assembly 27 engages the thereby freed or exposed ends of the blanks 25. In a generally similar manner, edge platforms or conveyors 92, 93 are provided at least immediately downstream of the end forming assembly 27 in order to support the formed ends of the links 88. In this manner, the blanks 25 and the links 88 are fully supported along their entire axial length during all stages of processing except for the brief time during which the ends are exposed when the function of supporting said is transferred from the edge platforms 89, 91 to the end forming assembly 27 and also during the time the ends are exposed during movement out of the end-forming assembly 27 and onto the edge platforms 92, 93.

The illustrated end forming assembly 27 includes a pair of block conveyors having an endless chain 94 guided for supported rotational movement by sprockets 95 or other suitable means. A series of identical blocks 96 are secured to each endless chain 94, and these blocks 96 are the components of the end forming assembly 27 that engage and form the ends of the blanks 25. By this arrangement, the blocks 96 are cammed into and encapsulate the ends of the blanks 25.

Preferably, the blocks 96 are heated in order to facilitate end formation. The illustrated manner of accomplishing this heating includes heated housings 97. Fluid injector assemblies 98 can also be included in order to spray a fluid onto the inside surface of the blocks 96 shortly before they engage the blanks 25. The fluid injected at this stage could be the same fluid used as the treating medium for forming the ribbon(s) or flow(s) of proteinaceous batter material 22 and the blanks 25 formed therefrom. It can also include cleansing and anti-fouling agents. Besides providing a treating fluid, the fluid injection assembly 98 achieves a lubrication function that facilitates end forming.

Figure 2:
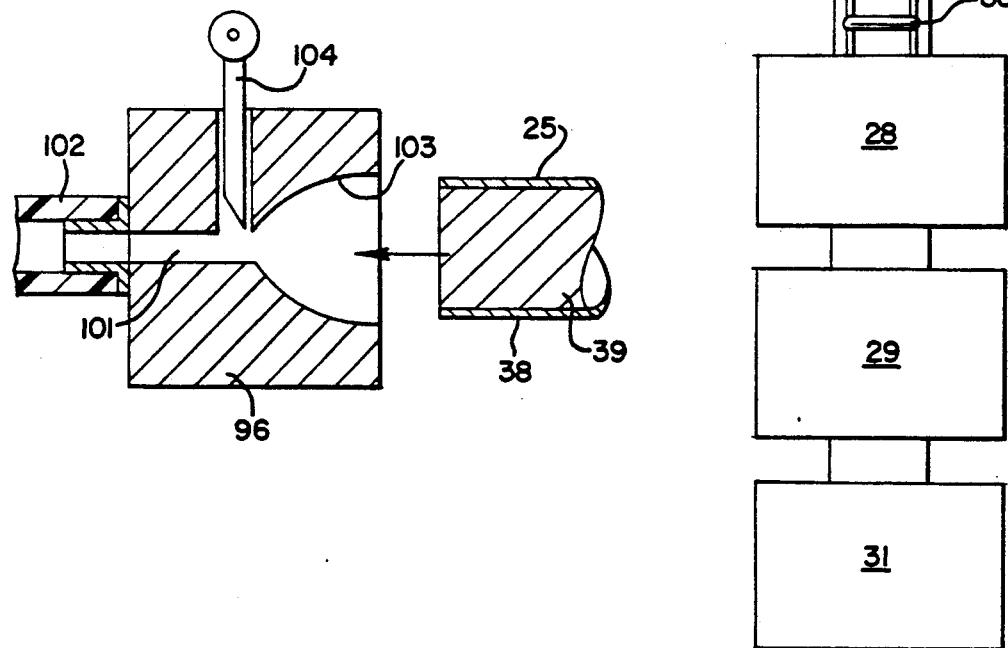
FIG. 2 is an enlarged, primarily cross-sectional detail view of an end-forming assembly according to the invention.
Figure 3:
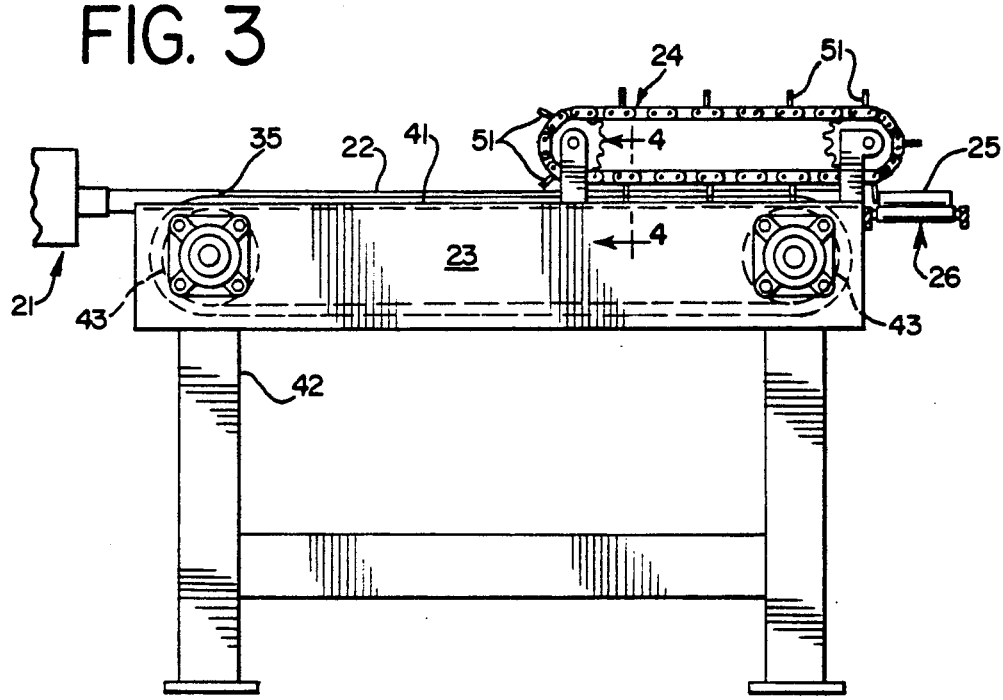
FIG. 3 is an elevational view along the line 3—3 of FIG. 1.
Figure 4:
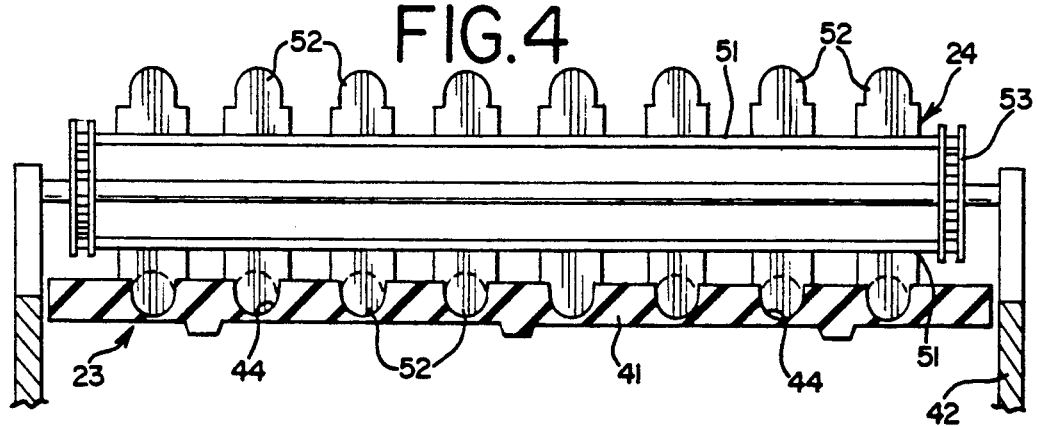
FIG. 4 is a cross-sectional view along the line 4—4 of FIG. 3.

Regarding the end forming function which is accomplished when the block 96 engages the end of a blank 25, particular reference is made to FIG. 2. Each block includes a passageway 101 secured to a vacuum line 102. Each vacuum line 102 is secured to a suitable low-pressure source through a suitable arrangement that will accommodate movement of the block conveyor, such as a manifold arrangement (not shown). After the block 96 is cammed into the path of and encapsulates the end of the blank 25, a vacuum is pulled through the passageway 101 in order to draw the blank into cavity 103 of the block 96. Typically, at this time a small amount of batter is repositioned within the core 39 of the blank 25, while the skin or hide 38 is pulled into a generally dome-like configuration. The congealed skin acts as a shut-off valve as it plugs the passageway 101, possibly reducing the amount of batter able to pass through to an inconsequential level. During this procedure, a small amount of batter may pass through the passageway 101 in order to facilitate collapsing of the blank end to form the desired shape such as the illustrated dome-like shape of the link 88. In a sense, the skin or hide 38 is sucked down as some of the unconcealed batter from the core 39 is removed. Heat and/or treating fluid from the block 96 congeals the batter, and the thus shaped end portion is set at the desired shape. The heating is believed to help form a thick skin. Batter collected through the passageway 101 can be collected and recycled. Separation of thus removed batter from the thus-formed end can be facilitated by including a cammed wick cutting unit 104 that moves into and through the passageway 101 at a location substantially flush with the apex of the cavity 103.

By this arrangement, it is possible to prepare blanks 88 having any of a variety of different end surface configurations. The illustrated embodiment prepares wiener ends having a configuration, shape and sizing that is substantially identical with that of wieners prepared by conventional procedures that include the use of casings in order to form the links or wieners. This includes the formation of wrinkles that give the appearance of an end which had been prepared in a casing having its ends gathered and tied in a well-known manner. The cavity 103 could include grooves or other formation features for purposes of forming these types of folds or creases. Whatever shape is to be imparted to the ends of the blanks, when that shape has a generally tapered configuration such as that of the cavity 103 and of the links 88, it is typically preferred that the taper be greater than desired for the finished product. More particularly, in the illustrated embodiment, cavity 103 provides an initially formed bullet end that is sharper or has a more elongated point than is desired for the finished product. It has been found that these sharper ends generally flatten out during subsequent cooking operations.

Regarding the cooking operations, heating assembly 28 only partially cooks the links 88, generally until the links 88 are congealed all the way through. A typical temperature for the links entering the heating assembly 28 is about 70° F. The temperature of the links upon leaving the heating assembly should be between about 120 and about 145° F. The heating assembly 28 can take the form of a convection oven or the like, and it can also include smokehouse features. Typically, the heating assembly 28 will include a controlled atmosphere having natural smoke, liquid smoke, and means for controlling conditions such as temperature, humidity and air flow.

Particularly efficient smoking can be practiced inasmuch as the uncooked links 88 do not have a casing, which would otherwise have to be penetrated by the smoke media when other devices are used. Facilities could also be provided for the utilization of liquid smoke or other flavoring components or devices. Uniformity of smoke application can be enhanced by continuing the roller conveyor into and through the heating assembly 28 and the secondary heating assembly 29.

It has been found that, if the links are cooked fully in a one-step process such as within the heating assembly 28, there is a strong tendency for the fat within the batter to be rendered, and the links tend to shrink or shrivel, providing finished products that have a poor appearance and that can be easily differentiated from the appearance provided by sausages made within casings. It is believed that advantages are obtained when the heating means 28 achieves a pre-cooking arrangement that raises the temperature of the links so that each link is congealed all of the way through but is not fully cooked.

In the illustrated embodiment, the secondary heating assembly 29 next treats the congealed links. Assembly 29 performs a function of spiking the temperature to up to about 170° F. Products raised to a temperature of at least about 170° F. are typically considered to be sterile, and it is usually advantageous to reach this temperature as the final cooking temperature whereby the product is fully cooked. Preferably, the secondary heating assembly 29 incorporates microwave energy in order to effect the needed cooking condition.

Regarding the packaging assembly 31, because the uncooked links 88 can be handled, at least to a certain acceptable extent, prior to cooking them or prior to completely cooking them, and because there is no casing that needs to be removed after cooking, it is possible to package the uncooked links 88 within the packaging apparatus when it is upstream (not shown) of either or both the heating assembly 28 or the secondary heating assembly 29. Generally speaking, these uncooked links 88 are packaged in a substantially raw state. Subsequent cooking is carried out after packaging, thereby enabling the formation of an aseptic package of the desired products, such as wieners, other sausages, or the like. An alternative cooking apparatus will typically include a hot-water cooking bath, a hot platter cooking apparatus, or the like. By utilizing this apparatus to form an aseptic package, subsequent treatments to enhance shelf-life, such as temperature reduction devices, can be eliminated. In effect, a pasteurized product is prepared which has a shelf-life of about six months, the cooked product having been packaged hot and then chilled within the finished package. In those instances where it is desired to prepare a packaged product having a shelf-life of about 72 to 85 days, the cooked links are chilled and then packaged within the packaging apparatus 31.

It is generally believed to be advantageous to utilize a roller conveyor for passing the links through the heating assembly 28 and the secondary heating assembly 29 because the links are well exposed and typically will rotate for even heat distribution. Other arrangements are possible, such as the use of an endless belt having channels therewithin for supporting the links during cooking.

While particular embodiments of the invention have been described, it will be apparent to those skilled in the art that various modifications thereof may be made without departing from the true spirit and scope of the invention. Accordingly, it is intended by the appended claims to cover all such modifications and equivalents which embody the inventive features as defined in the claims.

We claim:

1. An apparatus for forming a casingless proteinaceous shaped products, comprising:
   flow providing means for providing an elongated flow of proteinaceous batter material, the elongated flow having a proteinaceous skin thereon and a core portion including batter material which has not been formed into the proteinaceous skin;
   dwell conveying means for receiving and conveying the elongated flow of proteinaceous batter material and for providing a dwell time during which the proteinaceous skin thickens;
   means for severing the elongated flow of proteinaceous batter material into a plurality of blanks having unfinished ends;
   means for transferring the plurality of blanks to means for forming the unfinished ends, said forming means shaping the unfinished ends to thereby form shaped links; and
   cooking means for heating and cooking the shaped links into shaped and cooked link products.

2. The apparatus in accordance with claim 1, wherein said forming means shapes the unfinished ends into a generally dome-shaped configuration.

3. The apparatus in accordance with claim 1, wherein said end forming means includes a block member having a cavity and means for applying a vacuum to the cavity while an end of the blank is within the cavity, whereby said block means draws the blank into the cavity and imparts a shape to the end of the blank which is complementary to the shape of the cavity.

4. The apparatus in accordance with claim 1, wherein said end forming means includes camming means for engaging the unfinished ends of each blank within a shaping cavity and means for applying a vacuum to the cavity and thus to the unfinished ends while in engagement with the cavity, whereby said means for applying a vacuum draws the unfinished ends into the cavity and imparts a shape thereto which is complementary to the shape of the cavity.

5. The apparatus in accordance with claim 4, wherein the cavity is heated to a temperature greater than room temperature.

6. The apparatus in accordance with claim 4, further including means for injecting fluid into the cavity before the cavity engages the unfinished ends.

7. The apparatus in accordance with claim 1, wherein said cooking means includes heating means for raising said shaped links to a temperature at which the core portions of the links are congealed and secondary heating means for substantially fully cooking the shaped links having the congealed core portions into the shaped and cooked link products.

8. The apparatus in accordance with claim 7, wherein said heating means includes convection cooking means and said secondary heating means includes means for cooking with microwave energy.

9. The apparatus in accordance with claim 1, wherein said severing means is associated with said conveying means, and said severing means severs the elongated flow of batter material after the proteinaceous skin has thickened.

10. The apparatus in accordance with claim 1, wherein said dwell conveying means is substantially co-linear with the elongated flow of proteinaceous batter material from said flow providing means.

11. The apparatus in accordance with claim 1, wherein said means for providing an elongated flow of proteinaceous batter material is associated with means for treating the external surface of batter material in order to form the proteinaceous skin having an initial thickness, and wherein the dwell time provided by said conveying means increases the initial thickness of the skin.

12. The apparatus in accordance with claim 11, wherein said treating means contacts the proteinaceous batter material with an acidic composition.

13. The apparatus in accordance with claim 11, wherein said treating means imparts heat to the proteinaceous batter material.

14. The apparatus in accordance with claim 11, wherein said treating means applies both heat and a treating fluid to the proteinaceous batter material.

15. The apparatus in accordance with claim 1, wherein said means for providing an elongated flow of proteinaceous batter material includes an elongated tube and means for treating the batter material, said means for treating including orifice means generally peripherally disposed along the elongated tube, said orifice means passing treating fluid therethrough and onto the batter material external surface, said means for treating further including a ring member protecting into said elongated tube for engaging the batter material external surface at a location downstream of the orifice means.

16. The apparatus in accordance with claim 1, wherein said dwell conveying means includes an endless belt having at least one elongated channel therewithin, which elongated channel is substantially co-linear with and receives the elongated flow of proteinaceous batter material from said flow providing means.

17. The apparatus in accordance with claim 16, wherein said dwell conveying means endless belt includes a plurality of said elongated channels which are substantially parallel to each other, and wherein said flow providing means provides a plurality of elongated flows of proteinaceous batter material which are substantially parallel to each other.

18. The apparatus in accordance with claim 16, wherein said elongated channel is generally U-shaped in vertical cross section.

19. The apparatus in accordance with claim 18, wherein the generally U-shaped vertical cross section includes a generally semi-circular component extending to chamfered sides to provide a channel opening wider than the widest portion of the generally semi-circular component.

20. The apparatus in accordance with claim 16, wherein the severing means includes severance blade means which enters into the elongated channel, severs the flow of proteinaceous batter material and exits the elongated channel.

21. The apparatus in accordance with claim 20, wherein the severance blade means is a component of the transferring means.

22. The apparatus in accordance with claim 1, wherein said transferring means supports a central portion of each blank and said transferring means separately supports both end portions of each blank until immediately upstream of the means for forming the unfinished ends of the blanks, at which time the end portions are exposed for free engagement with the means for forming.

23. The apparatus in accordance with claim 1, further including packaging means for closely encapsulating the shaped links and for completing finishing thereof.

24. The apparatus in accordance with claim 23, wherein said packaging means is upstream of the cooking means and is for providing an aseptic package.

25. The apparatus in accordance with claim 23, wherein said packaging means is downstream of the cooking means.

26. In an apparatus for forming casingless proteinaceous shaped products, wherein a proteinaceous length is subjected to shaping of end portions thereof, the improvement comprising: an end forming means for shaping unfinished ends of blanks of proteinaceous batter material having an external proteinaceous skin, and a core portion of batter material which has not been formed into the proteinaceous skin, the end forming means including camming means for engaging the unfinished ends of each blank within a shaping cavity and means for applying a vacuum to the cavity and thus to the unfinished ends while in engagement with the cavity, whereby said means for applying a vacuum draws the unfinished ends into the cavity and imparts a shape thereto which is complementary to the shape of the cavity.

27. The apparatus in accordance with claim 26, wherein the camming means includes a block member having said cavity.

28. The apparatus in accordance with claim 26, wherein said cavity has a generally dome-shaped configuration.

29. The apparatus in accordance with claim 26, wherein the cavity is heated to a temperature greater than room temperature.

30. The apparatus in accordance with claim 26, further including means for injecting lubricating fluid into the cavity before the cavity engages the unfinished ends.

31. In an apparatus for forming casingless proteinaceous shaped products, wherein proteinaceous shaped products are made from a proteinaceous length without use of a casing, the improvement comprising:

dwell conveying means for receiving and conveying an elongated flow of proteinaceous batter material having an external proteinaceous skin and a core portion of batter material which has not been formed into the proteinaceous skin, the dwell conveying means including an endless belt having at least one elongated channel therewithin, which elongated channel is substantially co-linear with and receives the elongated flow of proteinaceous batter material, further including severing means associated with the dwell conveying means, said severing means including severance blade means which enters into the elongated channel, severs the flow of proteinaceous material, and exits the elongated channel after severance is completed.

32. The apparatus according to claim 31, wherein said elongated channel is generally U-shaped in vertical cross section.

33. The apparatus according to claim 32, wherein the generally U-shaped vertical cross section includes a generally semi-circular component extending to chamfered sides to provide a channel opening wider than the widest portion of the generally semi-circular component.

34. A method for forming a casingless proteinaceous shaped products, comprising the steps of:
providing an elongated flow of proteinaceous batter material, the elongated flow having a proteinaceous skin thereon and a core portion including batter material which has not been formed into the proteinaceous skin;
receiving the elongated flow of proteinaceous batter material and conveying the elongated flow in a direction that is substantially co-linear with a direction of the step of providing an elongated flow of proteinaceous batter material, said receiving and conveying step provides a dwell time and thickens the proteinaceous skin to enhance the handling strength of the elongated flow of batter material;
severing the elongated flow of proteinaceous batter material into a plurality of blanks having unfinished ends;
transferring the plurality of blanks and shaping the unfinished ends to thereby form shaped links; and
cooking the shaped links in order to provide a casingless proteinaceous shaped products.

35. The method in accordance with claim 34, wherein said shaping step imparts a generally dome-shaped configuration to the shaped links.

36. The method in accordance with claim 34, wherein said shaping step includes camming an unfinished end of the blank into a cavity, applying a vacuum while the unfinished end is in the cavity to pull some core portion proteinaceous batter material out of the unfinished end and to shape the proteinaceous skin around the core portion batter material at said end, thereby preparing the shaped link having an end portion generally complementary in shape to the cavity.

37. The method in accordance with claim 36, wherein said shaping step includes applying a treating fluid into the cavity thereby lubricating the cavity and end portions of the blank.

38. The method in accordance with claim 34, wherein the cooking step includes raising the temperature of the shaped links to between about 120° and about 145° F. until the core portions of the links are substantially congealed, followed by rapidly raising the temperature of the links to between about 170° F. and about 212° F. until the links are substantially cooked.

39. The method in accordance with claim 38, wherein the step of rapidly raising the link temperature includes applying microwave energy to the links.

40. The method in accordance with claim 34, wherein the dwell time of the receiving and conveying step is between about 30 seconds and about 90 seconds.

41. The method in accordance with claim 34, wherein said providing step includes treating the external surface of the batter material with an acidic composition in order to form an initial thickness of proteinaceous skin, and wherein the dwell time of said receiving and conveying step increases the initial thickness to at least about 20 thousandths of an inch.

42. The method in accordance with claim 34, further including the step of packaging the shaped links by closely encapsulating the links, wherein the packaging step includes finished the outside shape and appearance of the surface of the links.

43. The method in accordance with claim 42, wherein the packaging step is prior to completion of the cooking step.

44. The method in accordance with claim 42, wherein the packaging step is subsequent to the cooking step.

* * * * *

UNITED STATES PATENT AND TRADEMARK OFFICE
CERTIFICATE OF CORRECTION

PATENT NO.  : 5,118,519
DATED       : June 2, 1992
INVENTOR(S) : Mally et al.

It is certified that error appears in the above-identified patent and that said Letters Patent is hereby corrected as shown below:

Col. 7, line 37, "batter-leaving" should read --batter leaving--.
Col. 8, line 66, "said" should read --same--.
Col. 9, line 47, "unconcealed" should read --uncongealed--.
Col. 11, line 30, delete "a" after "forming".
Col. 12, line 52, "protecting" should read --projecting--.
Col. 14, line 26, delete "a" after "forming"; line 46, delete "a" after "provide".

Signed and Sealed this

Twentieth Day of September, 1994

Attest:

BRUCE LEHMAN

Attesting Officer

Commissioner of Patents and Trademarks